United States Patent Office 3,447,992
Patented June 3, 1969

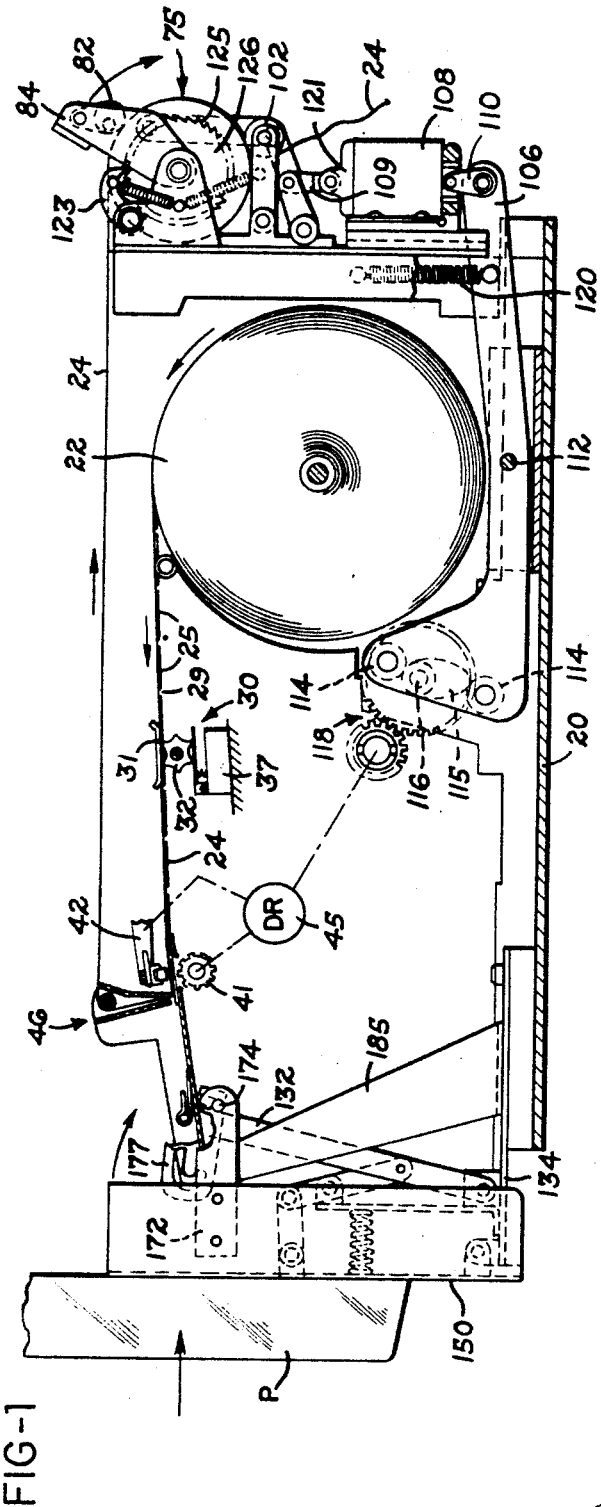
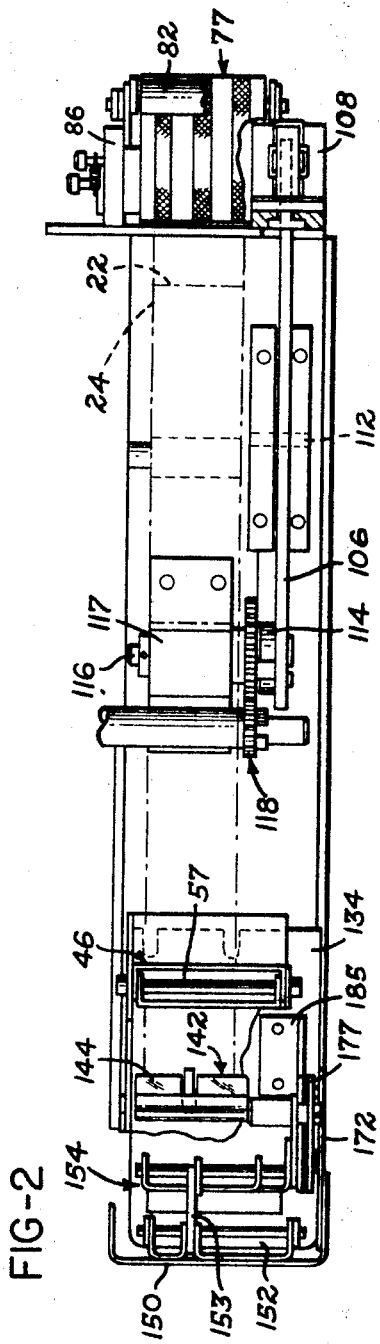

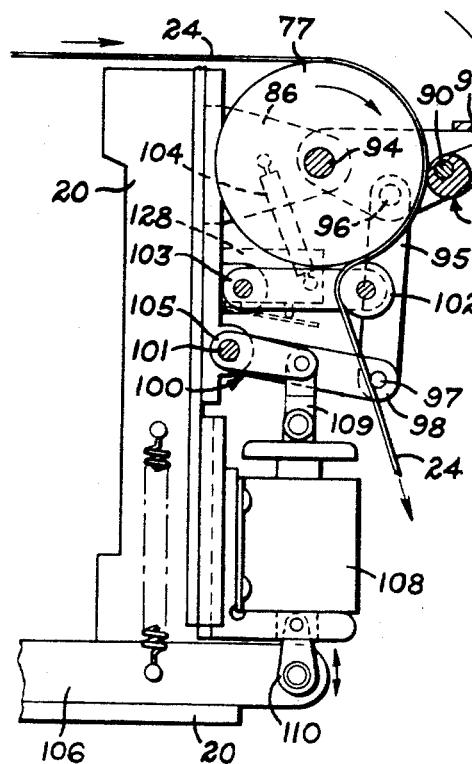
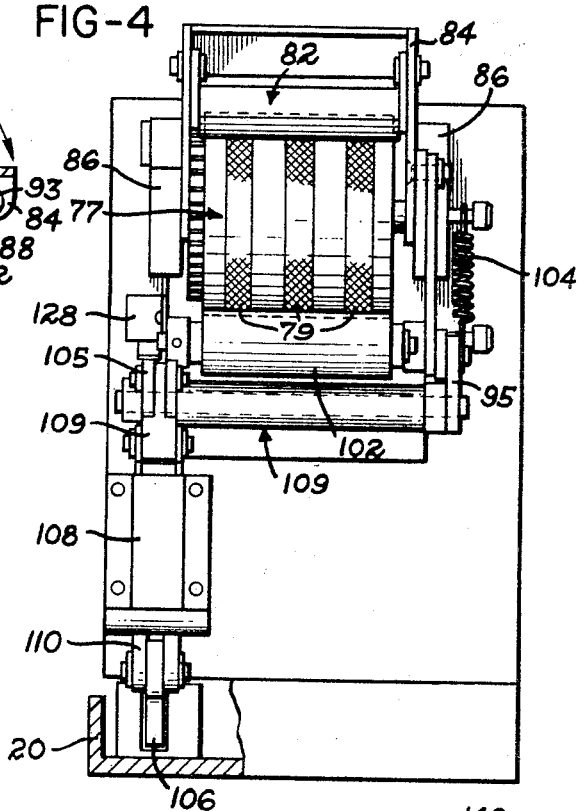
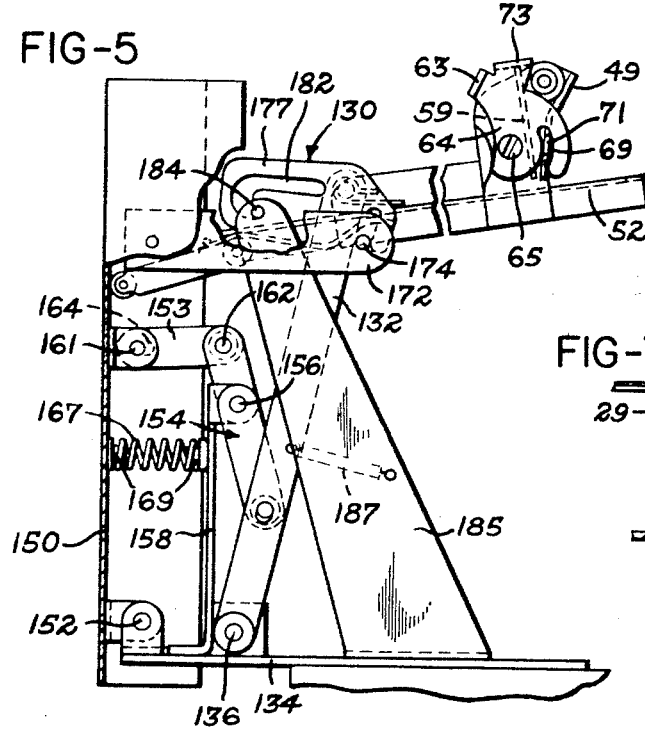
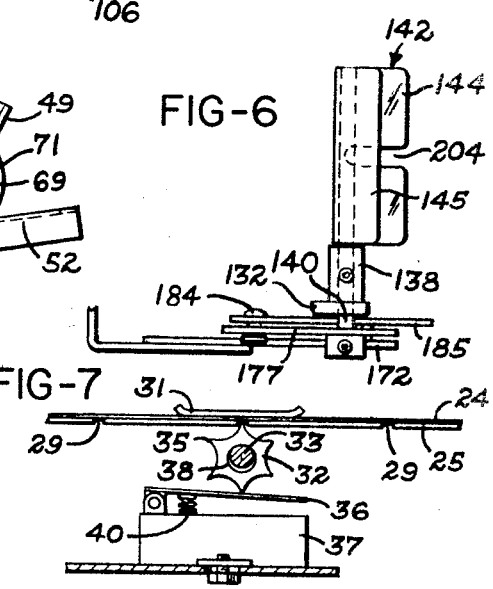
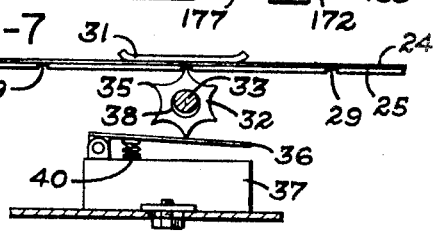

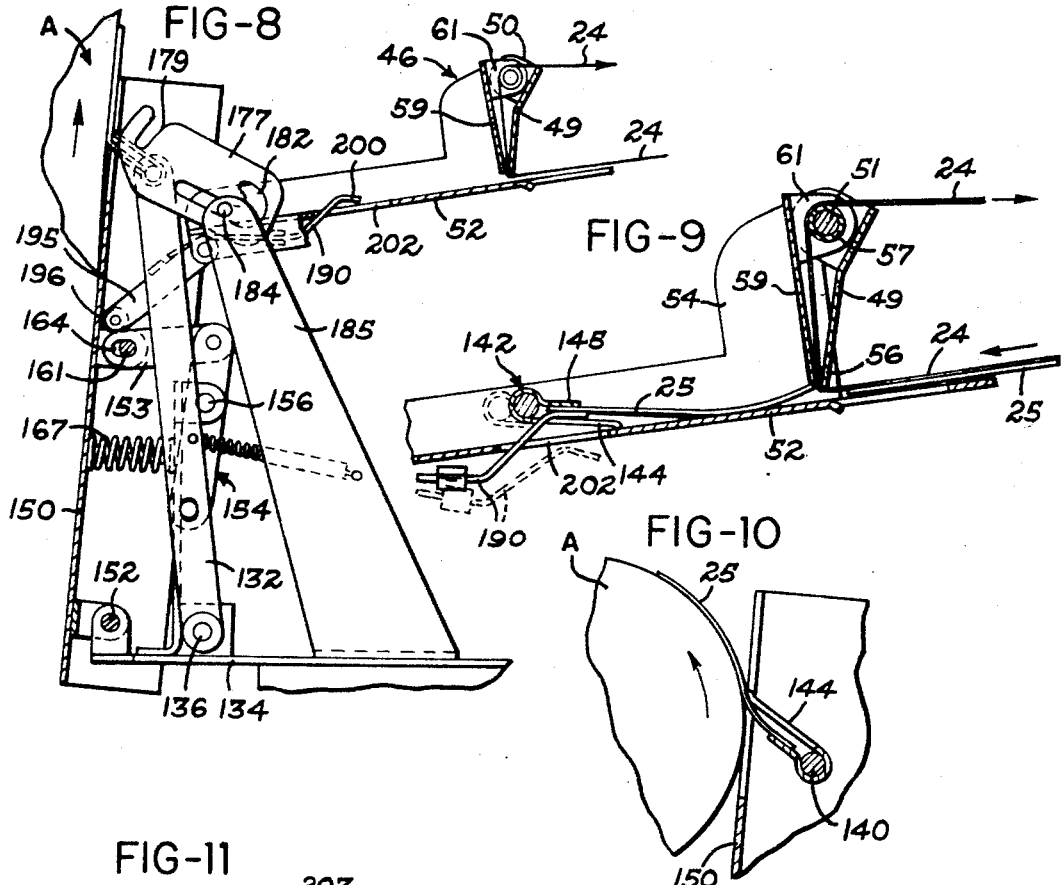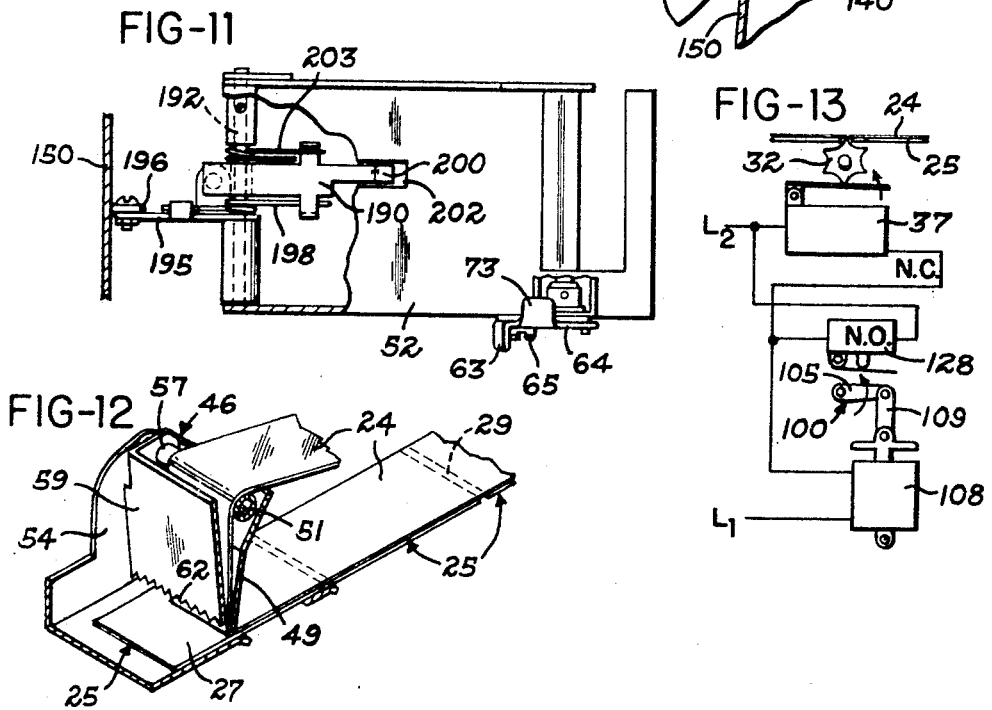

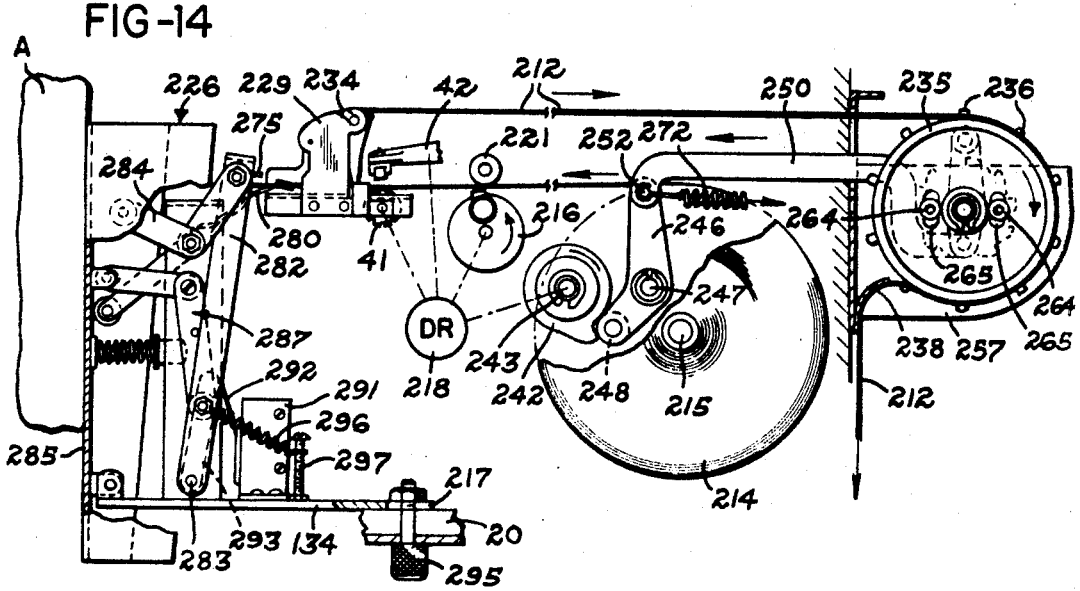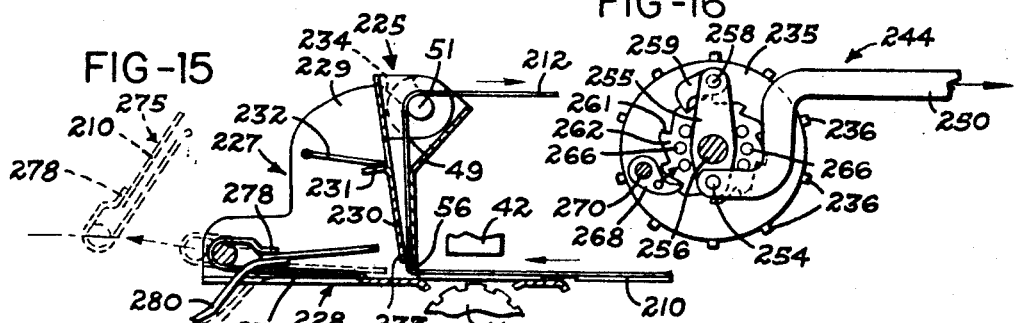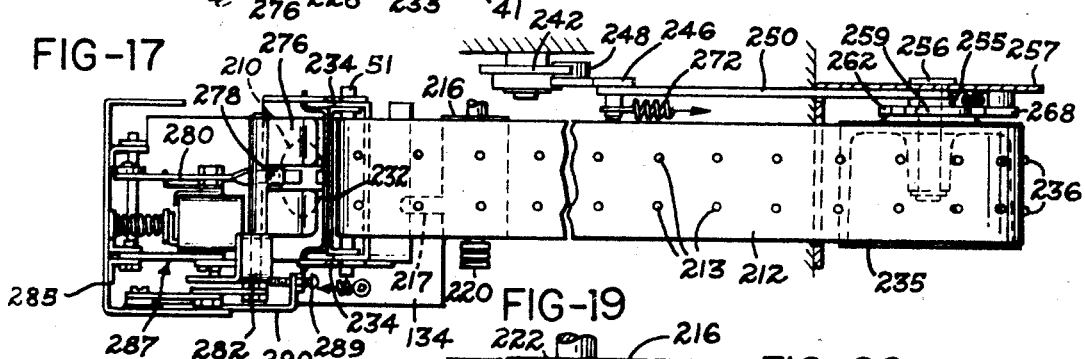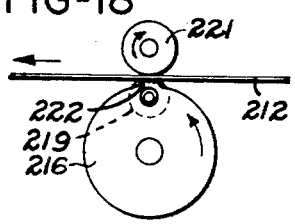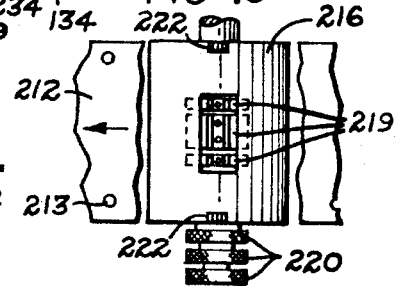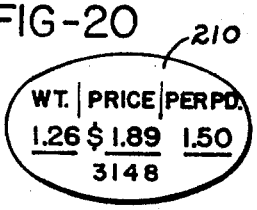

3,447,992
LABEL DISPENSER
Kenneth C. Allen and Helmut A. Vauk, Dayton, Ohio, assignors to The Hobart Manufacturing Company, Troy, Ohio, a corporation of Ohio
Filed Aug. 11, 1965, Ser. No. 478,868
Int. Cl. B65c 9/36, 9/42; B41f 19/00
U.S. Cl. 156—361                              19 Claims

ABSTRACT OF THE DISCLOSURE

A series of pressure sensitive adhesive labels carried by a tape are successively printed with different information, and each label is stripped from the tape immediately after it is printed and delivered to an application station spaced from the stripping station by a transfer member which engages the adhesive side of the label.

---

This invention relates generally to apparatus for dispensing labels, and more particularly, to an apparatus which receives pressure sensitive labels successively carried by a backup strip or tape, successively prints the labels with variable information, and then successively removes them from the tape for application onto a package or other article in response to presenting the article to the apparatus.

The apparatus of the invention is particularly adapted for use in a system where each individual pressure sensitive label is printed with certain information immediately prior to application onto an article. For example, the apparatus is ideally suited for use on a scale system as shown in Patent No. 2,948,466 and assigned to the same assignee as the present application, which is constructed to weigh food products or other commodities and to issue a printed label bearing thereon both the weight and the computed value of the weighed material. Scales of this character are particularly useful for food markets of the self-service type selling commodities such as meat in prepackaged form, with the printed label being attached to the package before the package is placed in the display case ready for selection by the customer.

Printing of a label immediately before application is also desirable from the standpoint that the names of different commodities can be interchanged on the labels, and further enables the use of different attractive designs and/or color combinations on the label. It is to be understood, however, that the apparatus of the invention can also be used for other purposes, as for example, automatic dispensing of pressure sensitive labels which have been preprinted with the same price or marking.

For some applications, it has been found desirable to employ pressure sensitive labels in connection with an automatic computing scale system instead of a label which is heat sealed to the package as shown in the above patent. For example, a pressure sensitive label with adhesive on one side is ideally suited for application where it is desirable to apply the label or ticket without warming the meat or other food product being weighed. Furthermore, it has been found that after a period of time, the bond between a heat sealed label and the package becomes weak. On the other hand, with many pressure sensitive labels, the bond between the adhesive backed labels and the packages has been found to increase in time regardless of the environment.

Accordingly, it is a primary object of the present invention to provide a novel dispensing apparatus for pressure sensitive labels, which is adapted for use with a computing scale system where a package or article is first weighed upon the scale and then presented to the apparatus for application of the pressure sensitive label which is printed with the weight and value of the article according to a predetermined price.

It is also an object of the invention to provide a novel apparatus for dispensing pressure sensitive labels and for conveniently applying the labels in a predetermined location on articles which may have an irregular surface, as for example, a bunch of bananas or carrots.

Still another object of the present invention is to provide an apparatus which is adapted to receive pressure sensitive labels successively carried on a backup tape, to separate each label from the tape, and then automatically transfer the label to the surface of an article in response to the presenting of the article.

It is also an object of the invention to provide a dispensing apparatus for pressure sensitive labels wherein each label is transferred by a smooth and quick rotary action whereby the adhesive side of the label is applied with sufficient force to cause the label to conform and adhere to the surface of the article whether it has a flat or an irregular surface.

Still another object of the invention is to provide a label dispensing apparatus having a transfer member including a portion of limited area which engages the adhesive side of the label in response to the presenting of the article for which the label is intended.

It is also an object of the present invention to provide a novel label dispenser having a drive mechanism for pulling a flat non-perforated backup tape through the apparatus in a step-by-step manner so that the labels are precisely fed according to a predetermined registration regardless of the variances in the length of the labels and/or their spacing on the backup tape.

Still another object of the invention is to provide a dependable apparatus for separating and applying a pressure sensitive label carried by a backup tape immediately after the label is printed and to prevent the printing of a successive label until after the preceding label has been applied.

Other objects and advantages of the invention will be apparent from the following description, the accompanying drawings and the appended claims.

In the drawings—

FIG. 1 is a side elevational view of the apparatus of the invention showing the general overall arrangement of the major components as adapted for use with a computing weighing scale of the type mentioned above;

FIG. 2 is a top view of the apparatus shown in FIG. 1;

FIG. 3 is an enlarged side elevational view of the drive mechanism which pulls the backup tape through the apparatus;

FIG. 4 is a rear elevational view of the drive mechanism shown in FIG. 3;

FIG. 5 is an enlarged elevational view of the stripping and transfer mechanisms for removing each label from its backup strip and applying it to an article or package;

FIG. 6 is an enlarged top view of the transfer member;

FIG. 7 is an elevational view of the label sensing mechanism which controls the length of the step-by-step advancement of the labels carried by the backup tape;

FIG. 8 is a detailed elevational view, partly in section, of the mechanism in FIG. 5 showing it in an operative position;

FIG. 9 is an enlarged fragmentary view of the stripping mechanism showing a label separated from the backup tape and ready for application;

FIG. 10 is an enlarged fragmentary view showing the application of a label to the contoured surface of an article;

FIG. 11 is a top view of the mechanism which joins a portion of the adhesive side of a label to the transfer member;

FIG. 12 is a perspective view of the label separating mechanism;

FIG. 13 is a schematic electrical diagram showing the control system for obtaining accurate registration and stepping movement of the labels to the printing mechanism;

FIG. 14 is a fragmentary side elevational view of another embodiment of the apparatus of the invention which is generally similar to FIG. 1;

FIG. 15 is an enlarged fragmentary view similar to FIG. 9 and showing the components for successively printing, stripping and transferring the labels from the supporting tape;

FIG. 16 is an elevational view of the opposite end of the drive drum shown in FIG. 14;

FIG. 17 is a top view of the apparatus in FIG. 14 and similar to the top view of FIG. 2;

FIG. 18 is a diagrammatic elevational view of the printing drum mechanism shown in FIG. 14;

FIG. 19 is a plan view of the printing drum shown in FIG. 18; and

FIG. 20 shows a typical pressure sensitive label which was printed by the apparatus of the invention.

Referring to the drawings, which illustrate preferred embodiments of the invention, the label dispenser of the invention is carried by a frame or base member 20 (FIG. 1) which preferably is also the main support frame of the printer shown in Patent No. 2,948,466. The frame serves to support a roll 22 of backup tape 24 for carrying a series of successively spaced pressure sensitive labels 25 (FIG. 12) having a top side adhesive surface 27 adjoining the tape 24. While a rectangularly shaped label is shown herein for purposes of illustration, it is to be understood that a label of practically any shape can be used.

It is desirable that each label be precisely spaced on the backup tape 24, but it has been found that the gap or space 29 provided between the ends of each label tend to vary by a slight amount. Thus to provide for accurate movement and registry of the labels, it has been found desirable to provide some means for determining the spacing of the labels 25 on the tape 24. For this purpose, a sensing mechanism 30 (FIG. 1) is provided and is adjustably mounted directly under the tape opposite a backup plate 31 mounted on the frame 20.

The mechanism 30 preferably includes a star wheel 32 (FIG. 7) rotatably mounted on a shaft 33 and having six evenly spaced sharp edges 35 which are adapted to pick up the leading edge of the labels 25 by projecting into the successive gaps 29. In operation, when the tape and label are passing under the plate 31 (FIG. 1), the leading edge of a label engages one of the sharp edges 35 of the star wheel 32 and rotates the wheel sufficiently to cause the diametrically opposed edge 35 to depress the actuating lever 36 of a control switch 37 (FIG. 7). As shown, the shaft 33 extends through an enlarged hole 38 in the star wheel 32, and thus the wheel 32 is free to float somewhat between the plate 31 and the lever 36 under the biasing force exerted by the compression spring 40. The drive mechanism controlled by the switch 37 is explained later.

Following the sensing mechanism 30, the labels 25 carried by the tape 24 are directed successively over the printing or type wheels 41 which are set according to the weight of the article, the price per pound, and the price of the article as computed by the scale system. An impression hammer 42 is provided directly above the type wheels 41 and is operated by the main drive 45 to strike the top side of the tape 24, causing the type impression on the wheels 41 to mark the labels 25. As mentioned above, the primary purpose of the sensing mechanism 30 is to provide accurate registration between each label and the type wheels 41.

Following the printing operation of the label, the tape 24 is directed and advanced into a separating mechanism 46. This mechanism comprises a plate member 49 (FIGS. 9 and 12) having ears 50 which are hinged for movement on a shaft 51 so that the plate 49 may be pivoted to provide an enlarged opening for conveniently inserting the tape 24 between the plate 49 and the bottom support plate 52. As shown in FIG. 9, the shaft 51 is supported in side plates 54 extending upwardly from the bottom plate 52. The bottom edge 56 of the separating plate 49 is provided with a relatively sharp radius around which the tape 24 is directed and then travels upwardly over a roller 57 supported by the shaft 51.

As the backup tape 24 proceeds or advances around this sharp edge 56, the labels 25 are peeled from the tape 24 (FIG. 12) and extend outwardly onto the bottom plate 52 until the trailing edge of the label engages the bottom edge of a guide plate 59. Preferably the bottom edge of the plate 59 is provided with serrations 62 (FIG. 12) which reduce the area of contact with the trailing edge of the label 25 so that the label can be easily pulled from the plate 59. For simplicity in inserting the tape 24 between the plates 49 and 59, the guide plate 59 is also pivotally mounted by the ears 61 (FIG. 9) about the shaft 51 and is released by manually moving the tab 63 (FIG. 5) extending from the locking lever 64 pivotally carried by the screw 65. A cam slot 69 is formed in the lever 64 and is adapted to lock the movable plate 49 by engaging an extending tab 71. The lever 64 is also provided with a tab 73 which is adapted to rotate over the top edge of the plate 59 for locking this plate in position.

After the backup tape 24 is separated from the labels 25, it is directed over the roller 57 and rearwardly, generally parallel and spaced above the run of tape 24 carrying the labels 25. At the rear of the apparatus is mounted a drive mechanism 75 which is adapted to grip the tape 24 from which labels have been removed and pull the tape and labels past the type wheels 41 and through the separating mechanism 46 immediately after the label is printed.

As shown in FIGS. 3 and 4, the drive mechanism 75 includes a drum 77 preferably having a roughened outer surface as shown in FIG. 4 comprising the three circumferential portions 79. This rough surface helps to provide a positive grip of the tape 24 which is held firmly against the outer surface of the drum by a swinging wedge member 82 carried by a bracket 84 pivotally mounted on the support blocks 86 extending from the frame member 20. As shown in FIG. 3, the wedge member 82 includes a cylindrical rod portion 88 which is eccentrically mounted on a pin 90 extending between the parallel arms 91 for purposes of fine adjustment. The assembly of the member 88 and the arms 91 is pivotally mounted on the bracket 86 by the shaft 93. The wedge member 82 is moved around the axis of the shaft 94 through the link 95 which is pivotally connected on one end to the bracket 84 by a pin 96 and pivotally connected by a pin 97 to the longer arm 98 of a lever mechanism 100 rotatably supported by the shaft 101.

Mounted below the drum 77 is a roller 102 which is carried by arms 103 pivotally mounted on the frame 20 and biased towards the drum 77 by a suitable tension spring 104. As shown in FIG. 3, the backup tape 24 extends around approximately 170° of the drum 77 and is directed outwardly from the drum 77 preferably by a curved guide chute (not shown) around the roller 102 into a suitable receptacle (not shown). Connecting the shorter lever arm 105 of the lever mechanism 100 with an actuating lever member or arm 106 is a solenoid 108 spaced between the upper connecting link 109 and lower link 110. The lever arm 106 is pivotally mounted on the frame 20 by a shaft 112 extending through approximately the center of the arm. The forward end of the arm 106 carries a pair of rollers 114 which serve as followers for the cam 115 rotatably mounted on a shaft 116 carried within the bearing 117 (FIG. 2) and driven from the main drive 45 through the reduction gears 118.

In operation, when the scale system has computed the price of an article, it signals a clutch mechanism (not shown) which controls the operation of the label dispensing apparatus causing the cam 115 to rotate one revolution. This movement of the cam 115 causes the lever arm 106 to pivot about the shaft 112 pulling downwardly on the bottom of the energized solenoid 108, which in turn rotates the drum 77 through the lever mechanism 100, and wedge member 82 presses the tape 24 firmly against the outer surface of the drum 77.

The pulling of the tape 24 by the rotation of the bracket 84 from the position of FIG. 1 toward that of FIG. 3 advances the label and tape 24 from the roll 22 until the leading edge of a label actuates the switch 37, in the manner described above. This actuation opens the switch 37, which is connected in series with the solenoid 108 (FIG. 13), and thus deenergizes the solenoid, causing immediate stopping of the movement of the tape while the lever arm 106 continues to move. Thus it can be seen that by properly positioning the sensing mechanism 30, the travel of the tape 24 can be precisely controlled so that only one label 25 is released from the backup tape 24 by the separating mechanism 46, and each label is accurately positioned with respect to the printing mechanism.

When the rear portion of the lever arm 106 travels upwardly in response to the biasing force exerted by the tension spring 120 and the continued rotation of the cam 115, it can be seen that the solenoid 108 moves upwardly until the armature 121 of the solenoid is back in its normal retracted position. Also, the lever mechanism 100 rotates the bracket 84 in a counterclockwise direction from the position of FIG. 3 to that of FIG. 1, carrying with it the wedge member 82, which releases the tape 24 and slides over the outer top surface of the tape held in firm engagement with the drum 77 by the roller 102. The drum 77 is prevented from rotating counterclockwise with the bracket 84 by means of a spring-loaded pawl 123 (FIG. 1) which is pivotally connected to the frame 20 and serves as a ratchet by engaging the teeth 125 of the gear 126 rigidly mounted on the end of the drum 77.

Referring to FIG. 13, to reenergize the solenoid 108 after the lever arm 106 returns to the position shown in FIG. 1, a normally open switch 128 (FIGS. 3 and 4) is mounted on the frame 20 above the lever mechanism 100 and is adapted to be actuated by the lever arm 105 when it returns to the position shown in FIG. 1. Switch 128 is connected to the line L₂ so that the solenoid 108 will be energized when the arm 105 closes switch 128. Switch 128 is provided with a slight overtravel so that the first movement of the tape 24 rotates the star wheel 32 to the position of FIG. 1 before switch 128 is opened, and the switch 37 then holds the solenoid in circuit until an edge 35 of the star wheel picks up the leading edge of the next label 25 thereby rotating the wheel to the position of FIG. 7.

Mounted forward of the separating mechanism 46 is a transfer mechanism 130 which operates from its normal retracted position (FIG. 5) to the advanced position of FIG. 8 in response to the presenting of a package P or article A. Generally, the mechanism 130 comprises an upwardly extending arm 132 which is pivotally mounted at its lower end on a base plate 134 by a pin 136. Mounted on the upper end of the arm 132 is a horizontally extending bushing 138 (FIG. 6), and a shaft 140 is rotatably supported in this bushing 138 and carries a U-shaped label receiving member 142 having a bottom support plate 144 and an upper lip 145.

Operation of the transfer mechanism 130 and forward movement of the arm 132 is controlled by a forward receiving plate 150 which is pivotally mounted at its bottom on the base plate 134 by the shaft 152. The receiving plate 150 is connected by a link 153 to a crank lever system 154 (FIG. 2) which pivots about the shaft 156 supported by a mounting plate 158 (FIG. 5). The upper end of the lever system 154 is connected to the forward receiving plate 150 by the link 153 pivotable about the pins 161 and 162. The forward end of the link 153 is provided with a slot 164 (FIG. 5) which receives the pin 161 to permit the receiving plate 150 to pivot rearwardly by a slight amount before rotating the crank system 154. Spaced between the front surface of the mounting plate 158 and the rear surface of the receiving plate 150 is a compression spring 167 which is supported and located by the internal plugs 169.

Extending from one side edge of the front receiving plate or member 150 is a rigidly mounted horizontally positioned arm 172 which pivots with the receiving plate 150 and serves to carry a pin 174 projecting inwardly from the arm 172. Rigidly mounted on the outer end of the shaft 140 (FIG. 6) is a cam plate 177 having a curved slot 179 formed therein and adapted to receive the pin 174. The forward portion of the cam plate 177 (FIG. 5) is provided with a J-shaped cam slot 182 which receives a pin 184 extending horizontally from the upper end of a support bracket 185 rigidly mounted on the frame 134. Connecting the bracket 185 to the arm 132 is a small tension spring 187 (FIG. 5) which serves to bias the arm 132 rearwardly in opposition to the compression spring 167. The force exerted by the spring 187, however, is not sufficient to overcome the force exerted by the spring 167, and thus the arm 172 and pin 174 tend to hold the transfer mechanism 130 slightly forward of its most rearward position.

In operation, when an article A or package P is pressed against the forward face of the receiving member 150, the plate 150 is pivoted rearwardly. During the first increment of movement of the plate 150, the arm 172 moves the transfer mechanism 130 rearwardly by a slight amount as a result of the pin 174 engaging the slot 179 in the cam plate 177 and the relief slot 164 provided in the link 153. This motion of the transfer mechanism 130 causes the label receiving member 142 to slide over the leading edge of the label 25 resting on the bottom support plate 52 (FIG. 9).

The first movement of the receiving plate 150 also serves to actuate a lever 190 (FIG. 11) which is pivotally mounted on a shaft 192 carried by the forward end of the bottom support plate 52. This actuation results from a downward rotary movement of a lever 195 which is also pivoted on the shaft 192 and has a roller 196 mounted on its forward end for engaging the back side of the receiving plate 150. A torsion spring 198 (FIG. 11) on the shaft 192 forms an operative connection between the levers 195 and 190 so that the counterclockwise movement of lever 195 caused by plate 150 results in similar movement of lever 190. The rear end of the lever 190 is provided with a projection 200 (FIGS. 8 and 11) which is adapted to extend through an opening 202 formed in the bottom support plate 52. Normally, however, the projection 200 is biased downwardly to the position shown in FIG. 9 by a torsion spring 203 (FIG. 11).

As the projection 200 is biased upwardly during the first movement of the receiving plate 150, the leading edge of a label 25 receives pressure from the top surface of the projection 200, since this projection extends upwardly through both the opening 202 in the support plate 52 and the corresponding slot 204 provided in the center of the bottom support plate 144. This pressure causes a limited area of the adhesive side of the label 25 to adhere to the underneath side of the upper lip 145 of the label receiving member 142.

The first rearward movement of the label receiving member 142 in response to the first pivoting motion of the receiving plate 150 has been found desirable to provide dependable engagement between the receiving member 142 and the leading edge of a label. It has been found that as a label is stripped from its backup tape and extends under the lower serrated edge 62 of the guide plate 59, the label has a tendency to curl and the trailing edge of the label tends to ride upwardly with the tape but is stopped by the serrated edge 62. After the label is completely stripped, however, the leading edge of the label drops down on the top surface of the bottom support plate 144.

After a portion of the adhesive side of a label is pressed against the upper lip 145 of the receiving member 142, the continued rearward movement of the receiving plate 150 causes the pin 184 to engage the curved surface of the cam slot 182 and the pin 174 to cam out of the slot 179 causing the cam plate 177 to rotate and to carry with it the shaft 140, which in turn causes rotary movement of the receiving member 142 and the attached label 25. The arm 132 moves forwardly simultaneously with the rotation of the receiving member 142 as a result of the crank lever system 154 connecting the arm to the receiving plate 150.

As the transferring mechanism 130 rotates the label quickly from its generally horizontally received position, the label is applied quickly against the surface of the package or article pressed against the receiving plate 150. The outer edge of the bottom support plate 144 serves as a wiper for the package so that as the package is moved upwards along the forward surface of the receiving plate 150, the edge portion of the label adhering to the lip 145 is pulled from the lip and is wiped down firming against the package.

When the package is removed from the receiving plate 150, the plate pivots forwardly in response to the pressure exerted by the compression spring 167, simultaneouly causing the transfer mechanism 130 to move rearwardly. The pin 184 extending within the slot 182 causes the cam plate 177 to rotate clockwise and thereby to return the receiving member 142 to the position shown in FIGS. 1 and 9.

In operation, when the label dispenser of the invention is employed with an automatic weighing and computing scale system, the placing of the package or article on the weighing platform of the scale results in the appropriate printing of a label through the setting of the type wheels 41 and actuation of the impression hammer 42. During the printing operation, the cam 115 is rotated one revolution and near the end of the revolution, the backup tape is pulled until the sensing mechanism 30 deenergizes the solenoid 108 which stops movement of the tape. Since the separating mechanism 46 is spaced immediately adjacent the printing mechanism, the label which is printed is immediately separated from the backup tape and moved out onto the bottom support plate 52.

The operations of printing and separating of the label from the backup strip are timed to be performed within a fraction of a second during the time interval in which the package or article is removed from the scale platform and presented to the receiving plate 150. The pressing of the package against the receiving plate then causes the label to be received within the receiving member 142 of the transfer mechanism 130 and transferred to the package in the manner described above. The construction of the transfer mechanism provides a quick snap action rotary movement of the label which is desirable to cause the major portion of the label to slap against the surface of the package or article. For example, when an article A having a curved outer surface (FIG. 10) is placed against the receiving plate 130, it is desirable that the loose end of the label be provided with such a snap action that the label tends to wrap around the article.

FIGS. 14-17 show a modified form of the apparatus of the invention for handling pressure sensitive labels 210 carried by a backup tape 212 having a series of uniformly spaced perforations 213. The use of such perforate tape makes it unnecessary to provide a mechanism for sensing the spacing of the labels such as the mechanism 30 shown in FIG. 1. That is, the precisely spaced perforations 213 are used to maintain accurate registration between each label and the type wheels 41.

Thus in FIGS. 14-17, a roll 214 of the pressure sensitive labels 210 carried by the backup tape 212 is mounted for free rotation on the spindle 215. In a manner similar to that shown in FIG. 1, the tape 212 and labels 210 are directed from the roll 214 to the space between the type wheels 41 and hammer 42 (FIG. 15) where each label receives printed information as shown in FIG. 20 relating to the weight, price per pound and computed price of the article placed on the scale as mentioned above.

In many installations, it has been found desirable to print on each label predetermined information such as the date code number "3148" on the label 210 shown in FIG. 20. To provide this printing operation, a print wheel or drum 216 (FIGS. 14, 18 and 19) is positioned ahead of the type wheels 41 and is adapted to be rotated or driven in synchronism with the rotation of the feed drum 235. As shown in FIGS. 18 and 19, the print drum 216 is provided with a series of type wheels 219 which are preset by the corresponding knobs 220 to print the desired code number as the labels and backup tape move between the drum 216 and the backup roll 221. The drum 216 is also provided on opposite ends with a series of teeth 222 which are aligned with the type wheels 219 and are adapted to engage, upon each revolution of the drum, the ends of each label to prevent relative movement or slippage between the drum 216 and the synchronized feed of the label and thus to prevent smearing of the printed number.

After the printing by the type wheels 41, the tape and labels are then advanced through the stripping mechanism 225 where the backup tape 212 is directed around the sharp edge 56 of the plate member 49 in a manner as described above causing each label 210 to be peeled or removed from the tape and directed to the transfer mechanism 226. As shown in FIG. 15, the stripping mechanism 225 includes a modified support bracket 227 having a bottom plate 228 and side plates 229 which support the guide plates 230 and 49. An integral tab 231 extends from the plate 230 and receives a U-shaped spring 232 extending between the side plates 229 for resiliently holding the plate 230 with its serrated lower edge 233 adjacent the tape 212 to prevent the trailing edge of the label 210 from being carried upwardly by the tape.

The modified support bracket 227 is also provided with a pair of slots 234 (FIG. 14) formed in the upper portion of the side plates 229 for receiving the laterally extending guide pin 51 around which the backup tape 212 is directed and extended rearwardly. Thus by pulling upwards on the spring 232, it passes over center so that the plates 49 and 230 may be removed as a unit along with the pin 51 for conveniently threading the backup tape 212 between the plates and over the pin.

As shown in FIGS. 14 and 16, the backup tape 212 extends rearwardly from the pin 51 of the stripping mechanism 225 and is directed around the outer surface of a feed drum 235 having thereon a series of stubs 236 which are uniformly circumferentially spaced to extend through the perforations 213. From the lower portion of the feed drum 235, the tape 212 is stripped from the studs 236 by a curved guide plate 238 so that the tape 212 may be collected in a suitable container or take-up roll.

In a manner as described above for the apparatus shown in FIG. 1, the labels 210 and backup tape 212 are advanced over the type wheels 41 and through the stripping mechanism 225 by the drive system 218. That is, the drive system 218 is adapted to set the type wheels 41, actuate the hammer 42, rotate the print drum 216, and rotate the cam 242 mounted on the shaft 243 in timed relationship after receiving a signal from the computing scale in accordance with the operation described in the above mentioned patent. Thus after the hammer 42 is actuated and a label 210 is printed with the predetermined information, the cam 242 causes the actuating mechanism 244 to index the feed drum 235 and thereby to advance one printed label 210 through the stripping mechanism 225.

Referring to FIGS. 14 and 16, the actuating mechanism 244 includes a rocker arm 246 which is pivotally mounted on the spindle 247. A roller 248 is mounted on the lower end of the rocker member 246 and is adapted to follow the contour of the cam 242 causing the rocker arm 246 to oscillate. A link member 250 is pivotally connected on one end by the pin 252 to the upper end of the rocker arm 246, and the opposite end of the link member is connected by a pin 254 to a lever 255 freely rotatable on the shaft 256 which extends from the bracket 257 and also supports the feed drum 235 (FIG. 17). The upper end of the lever 255 supports a pin 258 on which is pivotally mounted an indexing pawl 259 adapted to engage successively the notches 261 formed around the periphery of a ratchet wheel 262.

The ratchet wheel 262 is adjustably mounted on the end of the feed drum 235 by a pair of screws 264 (FIG. 14) which extend through the corresponding slots 265 formed in the end wall of the drum and threadably engage a corresponding pair of diametrically spaced holes 266 (FIG. 16) formed in the ratchet wheel 262. Thus to provide accurate registration between the labels 210 carried by the backup tape 212 and the type wheel 41 according to the size of the labels, the feed drum 235 can be adjusted relative to the ratchet wheel 262 and secured by the screws 264. That is, the feed drum can be rotatably adjusted relative to the actuating mechanism 244 to provide for accurate printing of each label.

The actuating mechanism 244 also includes a stop pawl 268 (FIG. 16) which is pivotally mounted on the shaft 270 and spring-loaded radially inwardly to prevent clockwise rotation (FIG. 16) of the feed drum 235 by the frictional drag between the pawl 259 and the ratchet wheel 262 when the lever 255 is returned clockwise to its normal position. Also, a tension pring 272 (FIG. 14) is provided to assure that the roller 248 follows the outline of the cam 242 when the cam is rotated.

Referring to the modified form of the transfer mechanism 226, as shown in FIGS. 14 and 17, the receiving member 275 includes a bottom support plate 276 which is normally positioned adjacent the lower edge 233 of the guide plate 230 and is adapted to receive a label 210 from the stripping mechanism 225. In a manner similar to that described above for FIG. 9, the receiving member 275 also includes a centrally located tab 278 (FIG. 17) which is brought into contact with a small portion of the upper adhesive side of a label 210 resting on the support plate 276 by actuation of the lever 280.

The receiving member 275 is rotatably supported on the transfer arm 282 which pivots about the shaft 283 in a manner similar to that described above for FIG. 5, but instead of employing the cam plate 177 (FIG. 8), a scissor linkage 284 connects the receiving plate 285 for rotating the label receiving member 275 relative to the transfer arm 282 when a package or article A is pressed against the receiving plate 285.

The forward movement of the transfer arm 282 which is pivotally supported by the base plate 134, in response to rearward pivoting of the receiving plate 285 is provided by a linkage system 287 similar to that shown in FIG. 5. Also, the slight counterclockwise rotation (FIG. 15) of the lever 280 during the initial rearward movement of the receiving plate 285 to attach the label to the tab 278 is similar in operation of the projection 200 shown in FIG. 8.

Referring to FIG. 17, preferably an adjusting screw 289 is carried by the bracket 290 extending from the receiving plate 285 and engages the rear edge of the transfer arm 282 for accurately positioning the receiving member 275 relative to the stripping mechanism 225 and also to the normal position of the lever 280. Thus the adjusting screw 289 eliminates the necessity of constructing the transfer mechanism 226 within highly precise tolerances.

An interlock switch 291 is mounted on the base plate 134 and carries an actuating lever 292 which is operated by an arm 293 rigidly mounted on the shaft 283 for movement with the transfer arm 282. The interlock switch 291 corresponds in function to switch 80 in Allen et al. Patent No. 2,948,466 and to switch 613 in Allen Patent No. 2,045,229, and its purpose is to prevent the completion of another cycle including the printing and stripping of a successive label before the preceding label within the receiving member 275 is transferred and applied to the article A.

In addition, a slot 217 (FIG. 17) is formed in the base plate 134 for receiving the mounting bolt 295 (FIG. 14) extending through the base 20 to provide for adjustably spacing the transfer mechanism 218 in relation to the stripping mechanism 225 when different size labels are used. Also, a tension spring 296 (FIG. 14) connects the transfer arm 282 with the screw 297 to assure that the receiving member 275 moves rearwardly to pick up the leading edge of a label during the initial rearward movement of the plate 285.

From the drawings and the above description, it can be seen that a pressure sensitive label dispensing apparatus according to the invention provides several significant features and advantages. In summary, the apparatus is ideally adapted for use with an automatic computing scale system where the pressure sensitive label is printed while retained by the backup tape in response to the weighing of the article. The corresponding label is then immediately stripped or separated from the tape and is presented for application on the article during the time interval between removal of the article from the scale platform and presenting it to the plate 150 or 285. Furthermore, the label is applied onto the surface of the article by a slapping action which provides for a strong bond of the label on the article.

As an additional feature, the two embodiments of the apparatus provide means for adjusting or controlling the drive mechanism for feeding the labels, which in turn provides precise registration between each label and the printing and separating mechanisms whether or not drive perforations are provided in the backup tape.

It should also be noted that the apparatus of the invention can readily be adapted for use with apparatus for wrapping and conveying successive wrapped articles to a scale forming a part of a complete scale system with which the apparatus of the invention is used. For example, instead of manually effecting application of each successive label to a package, the stripping mechanism of the invention could be connected to deliver each successive stripped label to a chute leading to an automatic label applying mechanism of the type shown in the application of Arvidson et al. Ser. No. 451,742, filed Apr. 29, 1965, now Patent No. 3,342,661.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for receiving a tape carrying a series of successively spaced pressure sensitive labels having an adhesive coating on one side in contact with the tape and for printing each label on the opposite side prior to application of each label to an article, comprising means for printing each successive label with different information, means for providing accurate registration between each successive label and said printing means, stripping means positioned adjacent said printing means for separating each successive printed label from the tape immediately following printing thereof, means defining an application station spaced from said stripping means, means for delivering each successive label after separation from the tape to said application station for application to the article, drive means engaging a portion of the tape from which the labels have been removed for pulling the tape through said stripping means to release successive labels therefrom, and means for actuating said drive means in response to completion of the operation of said printing means for stripping the printed label from the tape to present the adhesive side for application to the article.

2. Apparatus as defined in claim 1 comprising a solenoid adapted to control said drive means, a switch connected to operate said solenoid, and a rotary member positioned for engagement by the leading end of each successive label on the tape and movable thereby into an actuating position with respect to said switch.

3. Apparatus as defined in claim 1 including interlock switch means operable by said delivery means and connected to said drive means for preventing operation of said drive means and stripping of the next successive label until the preceding label has been delivered and applied to an article.

4. Apparatus as defined in claim 1 including a print wheel preceding said printing means and driven by said drive means for printing on each label identical information such as a date code before the labels receive the variable information.

5. Apparatus for receiving a tape carrying a series of successively spaced pressure sensitive labels having an adhesive coating on one side in contact with the tape, and for removing and applying each successive label to an article, comprising stripping means for separating each successive label from the tape, means defining an application station spaced from said stripping means, a transfer member movable between said stripping means and said application station and having means for engaging a predetermined area on the adhesive side of the edge portion of each successive label, drive means engaging a portion of the tape from which labels have been removed for pulling the tape through said stripping means to release successive labels therefrom, actuating means for moving said transfer member in response to contact by the article for carrying each released label to said application station and for applying the label to the article with the adhesive side facing the article, and said adhesive area of the label applied to the article being considerably greater than said predetermined area to assure release of the label from said transfer member.

6. Apparatus as defined in claim 5 wherein said actuating means includes a movable member adapted to be moved rearwardly in response to engagement by the article and is operatively connected to move said transfer member forwardly to slap the label on the article.

7. Apparatus for receiving a tape carrying a series of successively spaced pressure sensitive labels having an adhesive coating on one side in contact with the tape and for removing and applying each successive label to an article, comprising stripping means for separating each successive label from the tape, means defining an application station spaced from said stripping means, a transfer member movable between said stripping means and said application station and having means for receiving the leading edge portion of each label after separation from the tape, support means carried by said transfer member for engaging the non-adhesive side of the label to provide support of the label during movement of said transfer member, means on said transfer member for engaging a predetermined area on the adsive side of the label for retaining the label on said support means during transfer to said application station, drive means engaging a portion of the tape from which labels have been removed for pulling the tape through said stripping means to release the successive labels therefrom, and actuating means for moving said transfer member in response to presenting of the article to transfer the label thereto with the adhesive side facing the article.

8. Apparatus for receiving a tape carrying a series of successively spaced pressure sensitive labels having an adhesive coating on one side in contact with the tape, and applying each successive label individually to an article, comprising stripping means for separating successive labels from the tape and extending each label generally horizontally with the adhesive side positioned upwardly, a pivotable transfer member having means for receiving the leading edge portion of each successive label after separation from the tape, support means carried by said transfer member for engaging the non-adhesive side of a label to provide support of the label during movement of said transfer member, means on said transfer member for engaging a predetermined area of said receiving means with the adhesive side of the label for retaining the label on said support means during transfer, means associated with said transfer member for rotating said support means in response to pivoting of said transfer member, drive means engaging a portion of the tape from which labels have been removed for pulling the tape through said stripping means to release successive labels therefrom, and actuating means operatively connected for pivoting said transfer member and rotating said support means in response to contact of the article to apply the adhesive side of the label to the article.

9. Apparatus for receiving a tape carrying a series of successively spaced pressure sensitive labels having an adhesive coating on one side in contact with the tape, and applying each successive label individually to an article, comprising means for printing each successive label with different information, stripping means for separating each successive label from the tape following printing thereof, a movable transfer member having means for engaging a portion of each successive printed label after separation therefrom, means for rotatably mounting said engaging means on said transfer member, drive means engaging a portion of the tape from which labels have been removed for pulling the tape through said stripping means to release successive labels therefrom, and actuating means for pivoting said transfer member and rotating said engaging means in response to contact of the article to revolve the label and apply the adhesive side of the label to the article.

10. Apparatus for receiving a tape carrying a series of successively spaced pressure sensitive labels having an adhesive coating on one side in contact with the tape, and applying each successive label individually to an article, comprising type wheel means for printing each label with different information, stripping means for separating each successive label from the tape following printing thereof and extending each successive label generally horizontally with the adhesive side positioned upwardly, a pivotable transfer member having means for receiving the leading edge portion of each label after separation from the tape, support means carried by said transfer member for engaging the nonadhesive side of a label to provide support of the label during movement of said transfer member, means for engaging a predetermined area of said receiving means with the adhesive side of the label for retaining the label on said support means during transfer, drive means engaging a portion of the tape from which labels have been removed for pulling the tape through said stripping means to separate successive labels therefrom, means for providing accurate registration between each label and said type wheel means, a movable actuating member adapted to be engaged by the article, and lever means connecting said actuating member and said transfer member for pivoting said transfer member forwardly while simultaneously rotating said support means in response to contact of the article with said actuating member to transfer and apply the label to the article by slapping the adhesive side thereof against the article.

11. Apparatus as defined in claim 10 including means for adjusting the normal position of said receiving means of said transfer member in relation to said stripping means for handling labels of different shapes and sizes.

12. Apparatus for receiving a perforated tape carrying a series of successively spaced pressure sensitive labels having an adhesive coating on one side in contact with the tape, and applying each successive label individually to an article, comprising means for printing each successive label with different information, adjustable means for providing accurate registration between each successive label and said printing means, stripping means positioned adjacent said printing means for separating each successive printed label from the tape immediately following printing thereof, means defining an application station spaced from said stripping means, a transfer member movable between said stripping means and said application station and having means for engaging a portion of each successive printed label after separation from the tape, drive means including a member having projections for engaging the perforations in the tape and adapted to pull the tape through said stripping means for releasing successive labels therefrom, means for actuating said drive means in response to completion of the operation of said printing means, and means for moving said transfer member to transfer the label and apply the adhesive side to the article.

13. Apparatus for receiving a perforated tape carrying a series of successively spaced pressure sensitive labels having an adhesive coating on one side in contact with the tape, and applying each successive label individually to an article, comprising type wheel means for printing each successive label with different information, stripping means for separating each successive label from the tape and extending each successive label generally horizontally with the adhesive side positioned upwardly, a pivotable transfer member having means for receiving the leading edge portion of each label after separation from the tape, support means carried by said transfer member for engaging the non-adhesive side of a label to provide support of the label during movement of said transfer member, lever means for engaging a predetermined area of said receiving means with the adhesive side of the label for retaining the label on said support means during transfer, drive means including a rotatable member having means for engaging the perforations in the tape to pull the tape through said stripping means to separate successive labels therefrom, adjustable means associated with said drive means for providing accurate registration between each label and said type wheel means, a movable actuating member adapted to be engaged by the article, and pivotable lever means connecting said actuating member and said transfer member for pivoting said transfer member forwardly while simultaneously rotating said support means in response to contact of the article with said actuating member to transfer and apply the adhesive side of the label against the article.

14. Apparatus for receiving a tape carrying a series of successively spaced pressure sensitive labels having an adhesive coating on one side in contact with the tape, comprising means for printing each successive label with different information, stripping means positioned adjacent said printing means for separating each successive label from the tape immediately following printing thereof, drive means for engaging a portion of the tape from which the labels have been removed for pulling the tape past said stripping means to release successive printed labels therefrom and to expose the adhesive side of the releas label, means defining an application station spaced frc said stripping means, a label delivery mechanism havi a movable transfer member disposed to engage a predet mined area on the exposed adhesive side of each st cessive printed label, and means for moving said transf member to carry the label from said stripping means said application station where the adhesive side of t label is applied to the article corresponding to the i formation printed on the article.

15. Apparatus as defined in claim 14 including mea responsive to presentation of the article corresponding the information printed on the label for actuating sa moving means for said transfer member, and means f actuating said drive means in response to completic of the operation of said printing means.

16. Apparatus as defined in claim 14 including mea for providing accurate registration between each su cessive label and said printing means, said stripping mea being positioned immediately following said printii means for separating each successive label from the taj immediately following the printing of the label.

17. Apparatus as defined in claim 14 wherein sa stripping means is disposed to extend each label general horizontally with the adhesive side facing upwardly, ar said delivery mechanism includes means for rotating tl label until its adhesive side faces downwardly to provic for effective application of the label to the article.

18. Apparatus as defined in claim 17 including a mov ble actuating member adapted to be engaged by the articl and lever means connecting said actuating member 1 said transfer member and operable to rotate said tran fer member in response to contact of the article wit said actuating member.

19. Apparatus as defined in claim 14 wherein said prin ing means includes a series of type wheels for printir each successive label with different information, and sai drive means includes a rotatable drum member havin projections for engaging perforations in the tape, mear for rotating said drum member for pulling the tap through said stripping means to release successive labe from the tape, and adjustment means associated wit said drum member to provide accurate registration bt tween each label and said type wheels.

References Cited

UNITED STATES PATENTS

| | | | |
|---|---|---|---|
| 2,687,819 | 8/1954 | Hill et al. | 216— |
| 2,948,466 | 8/1960 | Allen et al. | 235—5 |
| 3,145,792 | 8/1964 | Bell | 177— |
| 3,193,211 | 7/1965 | Flood | 242—75.4 |
| 3,238,080 | 3/1966 | Schluter | 156—35 |
| 3,240,652 | 3/1966 | La Mers | 156—36 |
| 3,321,105 | 5/1967 | Marano | 221—2 |

FOREIGN PATENTS 737,307   6/1966   Canada.

EARL M. BERGERT, *Primary Examiner.*

D. J. FRITSCH, *Assistant Examiner.*

U.S. Cl. X.R.

156—363, 384, 542, 584